(12) United States Patent
Hui et al.

(10) Patent No.: US 7,647,077 B2
(45) Date of Patent: Jan. 12, 2010

(54) METHOD FOR ECHO CONTROL OF A WIRELESS HEADSET

(75) Inventors: Siew Kok Hui, Singapore (SG); Eng Sui Tan, Singapore (SG); Kok Heng Loh, Singapore (SG)

(73) Assignee: Bitwave Pte Ltd, Singapore (SG)

( * ) Notice: Subject to any disclaimer, the term of this patent is extended or adjusted under 35 U.S.C. 154(b) by 495 days.

(21) Appl. No.: 11/420,768

(22) Filed: May 29, 2006

(65) Prior Publication Data

US 2006/0270468 A1 Nov. 30, 2006

Related U.S. Application Data

(60) Provisional application No. 60/685,414, filed on May 31, 2005.

(51) Int. Cl.
*H04B 1/10* (2006.01)
(52) U.S. Cl. .................. 455/570; 379/406.02; 381/94.7
(58) Field of Classification Search ............... 455/41, 455/1, 570, 41.1; 381/71.8, 367, 387, 71.1, 381/71.12, 94.1, 94.7; 379/406.1–406.16
See application file for complete search history.

(56) References Cited

U.S. PATENT DOCUMENTS

| | | | | |
|---|---|---|---|---|
| 6,185,300 | B1 * | 2/2001 | Romesburg | 379/406.09 |
| 6,889,066 | B2 * | 5/2005 | Gupta et al. | 455/570 |
| 7,110,554 | B2 * | 9/2006 | Brennan et al. | 381/94.7 |
| 7,110,800 | B2 * | 9/2006 | Nagayasu et al. | 455/575.2 |
| 7,251,322 | B2 * | 7/2007 | Stokes et al. | 379/406.12 |
| 7,359,504 | B1 * | 4/2008 | Reuss et al. | 379/406.02 |
| 2005/0069161 | A1 * | 3/2005 | Kaltenbach et al. | 381/312 |
| 2005/0249355 | A1 * | 11/2005 | Chen et al. | 381/71.14 |
| 2006/0147029 | A1 * | 7/2006 | Stokes et al. | 379/388.07 |
| 2007/0211909 | A1 * | 9/2007 | Yen | 381/94.1 |

* cited by examiner

*Primary Examiner*—Blane J Jackson
(74) *Attorney, Agent, or Firm*—Pyprus Pte Ltd

(57) ABSTRACT

The present invention provides a wireless headset with echo control and noise cancellation. The present invention also provides a method with phase reversion for echo control of a wireless headset wherein the wireless headset comprises closely disposed speakers and acoustic sensors. The present invention further provides a method with beamforming for noise cancellation of a wireless headset wherein the wireless headset comprises two separate units disposed in distance, and wherein each unit comprises an acoustic sensor.

4 Claims, 5 Drawing Sheets

METHOD FOR ECHO CONTROL OF A WIRELESS HEADSET

FIELD OF THE INVENTION

The present invention generally relates to audio wireless communications, and more particularly to a wireless headset system with acoustic echo control and noise cancellation.

BACKGROUND OF THE INVENTION

A conventional wireless headset is typically designed to playback music without having to interface with other applications. However, due to advent of Bluetooth technology and its wide application in mobile phones as a hands-free solution, a wireless headset can be designed with dual functions: to listen to high quality music and at the same time to be able to receive incoming calls from and input outgoing calls to a mobile phone as well as inter-communication among headsets.

When a wireless headset has the capacities of receiving incoming calls and inputting outgoing calls, it is generally attached with a boom microphone. While such design provides a voice input channel to the headset, the "boom" of the microphone imposes an awkward ID issue to the overall appearance of the headset. In addition, the design of "boom" microphone normally involves movable mechanical parts; this affects the durability of the headset and the manufacturing cost.

It is possible to eliminate the use of "boom" design by embedding the microphone into the housing of a headset. However, due to close proximity between the embedded microphone and headset speaker, echo from the headset speaker will be picked up by the embedded microphone due to acoustic coupling, thus making the headset impractical for communication without echo-cancellation.

Another major problem for microphones in a wireless headset is that the microphones can pick up ambient noises so that the quality of voices is impaired by the ambient noises. For example, wind flow over a microphone will induce significant amounts of low frequency noise. U.S. Pat. App. 2006/0034476 A1 discloses a wireless communication headset for reducing wind-induced noise by disposing the microphone in a cavity of the headset, but the headset is bulky because the microphone portion is protruded from the speaker portion.

Yet another problem of a headset with embedded microphone is the low signal to noise ratio (SNR) because the distance of microphone is farther away for the mouth position, thus affecting the speech quality for communication. Since the coding/decoding process through mobile phone network requires good speech signal at the input, the quality of speech signal becomes critical for the headset with embedded microphone.

Therefore, there is an imperative need of providing a wireless headset with echo control and noise cancellation. The present invention satisfies all the requirements by providing a headset that has embedded microphones, where the embedded microphones have such configurations that the echoes from the speakers are well controlled and the noises from the ambient environment are minimized if not completely eliminated. Other advantages are apparent in view of the detailed description hereinafter.

SUMMARY OF THE INVENTION

One embodiment of the present invention provides a wireless communication system with echo control and noise cancellation. The wireless communication system comprises two separate units, wherein each unit comprises a speaker, an acoustic sensor disposed within the housing of the speaker, and a wireless electronic circuitry embedded within the housing of the speaker; whereby the speaker is electronically coupled with the wireless electronic circuitry so that when the wireless electronic circuitry receives an audio signal from a detached audio signal source, the wireless electronic circuitry outputs the received audio signals to a user via the speaker; and whereby the acoustic sensor is electronically coupled with the wireless electronic circuitry so that when the wireless electronic circuitry receives an audio signal from the acoustic sensor, the wireless electronic circuitry processes the received audio signals and outputs the processed signals.

In another embodiment of the wireless communication system, the acoustic sensor is of omni directional type. In yet another embodiment of the wireless communication system, the wireless electronic circuitry comprises an audio signal processing unit for the input/output audio signal processing; a radio frequency unit electronically coupled with the audio signal processing unit, wherein the RF unit provides the wireless capability for data exchange with a base station; and a control logic unit electronically coupled with the audio signal processing unit and the radio frequency unit, wherein the control logic unit manages the flow control and interaction between different functional units. In a further embodiment of the wireless communication system, the wireless electronic circuitry further comprises a means for performing phase inversion of the audio signals to produce sound waves in opposite phase from the speakers when mono audio signals are applied. In a still further embodiment of the wireless communication system, the means for performing phase inversion is an electronic circuitry with designated wiring sequence that reverses the phases of audio signals to the two speakers. In another still further embodiment of the wireless communication system, the means for performing phase inversion is software embedded within the wireless electronic circuitry.

In another embodiment of the wireless communication system, the wireless electronic circuitry further comprises a digital filter that filters the echoes from the speakers.

In another embodiment of the wireless communication system, the wireless electronic circuitry further comprises a beamformer/noise suppressor that comprises a Filter Coefficients module for filtering out noises and an adder for summing the signals from both acoustic sensors before outputting them. In a further embodiment of the wireless communication system, when the two acoustic sensors are disposed in distance, a sweet zone is formed so that the beamformer/noise suppressor cancels all signals outside of the sweet zone.

In another embodiment of the wireless communication system, the two separate units form a headset so that each unit is disposed upon each ear of a human head when the headset is worn.

In another embodiment, the wireless communication system further comprises a base station electronically communicating the two separate units. In a further embodiment of the wireless communication system, the base station is a mobile phone, a MP3 player, a computer, another headset system or any electronic device that can receive/output audio signals wirelessly.

Another embodiment of the present invention provides a method for echo control of a wireless communication system wherein the wireless communication system comprises closely disposed speakers and acoustic sensors. The method comprises inversing the phases of the output audio signals from the speakers so that the signals from the speakers that are picked up by the acoustic sensors will be suppressed, resulting in echo control.

In another embodiment of the method, the step of inversing the phases comprises employing an electronic circuitry so that the audio signals to two speakers are inversed in terms of phases. In a further embodiment of the method, the step of inversing the phases comprises employing a software that can inverse the phases of audio signals.

Another embodiment of the present invention provides a method for noise cancellation of a wireless communication system wherein the wireless communication system comprises two separate units disposed in distance, and wherein each unit comprises an acoustic sensor. The method comprises performing beamforming using a beamformer so that any audio signals outside of a sweet zone defined by the beamformer will be cancelled.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The following patents/patent applications by the same applicant of the present invention are incorporated herein by reference:

1. U.S. Pat. No. 6,249,581 B1 with a title of "Spectrum Based Adaptive Canceller Of Acoustic Echoes";

2. International Application No. PCT/SG99/00119 with a title of "Signal Processing Apparatus";

3. International Application No. PCT/SG02/00149 with a title of "System and Apparatus for Speech Communication and Speech Recognition"; and 4. U.S. patent application Ser. No. 10/891,120 with a title of "Signal Processing Apparatus and Method for Reducing Noise and Interference in Speech Communication and Speech Recognition".

It is to be noted that the description herein below will employ certain specific figures and configurations to illustrate the principles of the present invention, but the invention can be practiced without the specifics. On the other hand, many details are not provided herein for the sake of not obscuring the invention.

Figure 1:
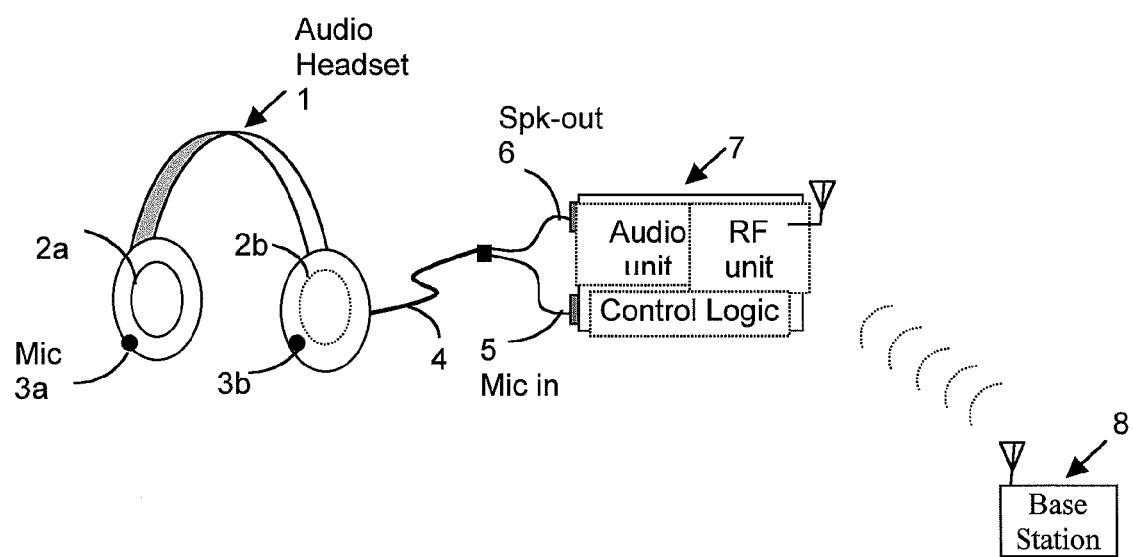
FIG. 1 shows an exemplary wireless headset system with a functional block diagram of the wireless electronic circuitry in accordance with one embodiment of the present invention.

One aspect of the present invention provides a wireless headset system that has compact appearance with excellent echo control and noise cancellation. As shown in FIG. 1, there is provided an exemplary wireless headset system with a functional block diagram of the wireless electronic circuitry in accordance with one embodiment of the present invention. The wireless headset system comprises a wireless headset 1 and a base station 8, where the wireless headset 1 wirelessly communicates with the base station 8. The base station 8 may be a mobile phone, a MP3 player, a computer, another wireless headset system or any electronic device that can receive/output audio signals wirelessly.

Referring to FIG. 1, the wireless headset 1 comprises two separate units (for convenience of description, the two separate units will be designated arbitrarily as left unit and right unit). The left unit and right unit may be physically connected as shown in FIG. 1. It is to be noted that the left unit and right unit may be detached from each other as long as two units can be worn by a user comfortably. The left unit comprises a speaker 2a, an acoustic sensor 3a, and a wireless electronic circuitry 7; and the right unit comprises a speaker 2b, an acoustic sensor 3b, and a wireless electronic circuitry 7. The wireless electronic circuitry 7 comprises an audio unit, a RF unit, and a Control logic unit, where the wireless electronic circuitry is electronically connected with Mic 3a/3b through Mic-in 5 whereas speaker 2a/2b can be electronically connected through Spk-out 6.

In a typical application scenario, audio data such as music or voice is transmitted from the base station 8 and received by the wireless electronic circuitry 7. The audio data is then output to the speaker 2a/2b through the spk-out 6. Conversely, speech signal from a user will be picked up by the acoustic sensors 3a/3b and transmitted to the wireless electronic circuitry 7 via the mic-in 5; the signals are then processed and sent to the base station 8.

The acoustic sensors 3a/3b should be mounted on a suitable position on the left unit and right unit of the headset. In one embodiment of the present invention, the acoustic sensors 3a/3b are disposed within the housing of the left/right speakers 2a/2b. FIGS. 2a-2d illustrate an exemplary layout of the wireless headset with its acoustic sensors being disposed within the housings of the speakers. The acoustic sensors 3a/3b may be of omni directional type because it is less subject to acoustic constraints, thus providing better degree of freedom for acoustic design.

Figure 2A:
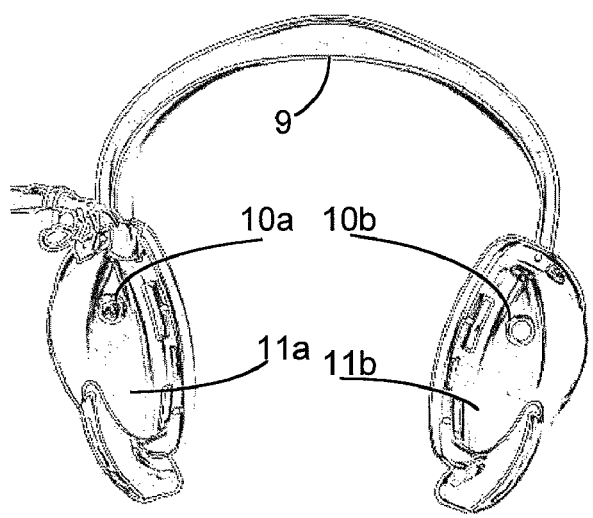
FIGS. 2a-2d illustrate an exemplary layout of the wireless headset with its acoustic sensors being disposed within the housings of the speakers.
Figure 2B:
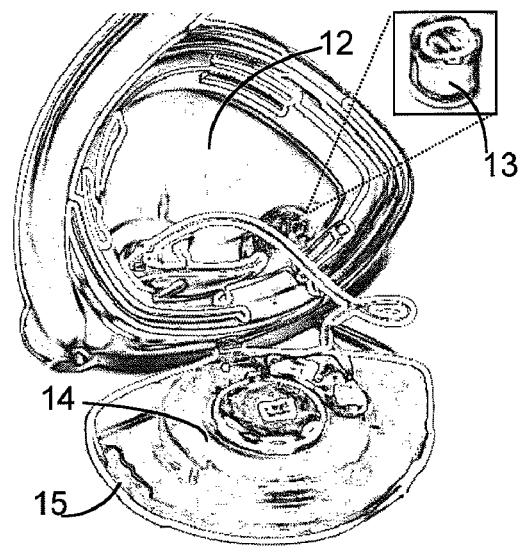
Figure 2C:
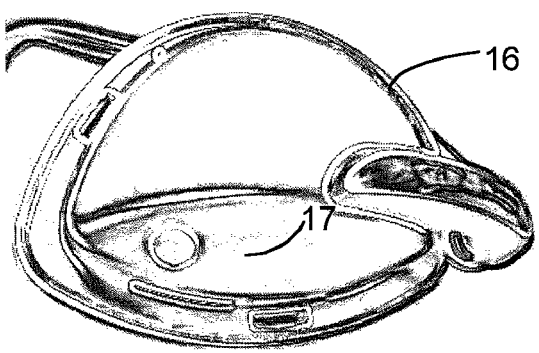
Figure 2D:
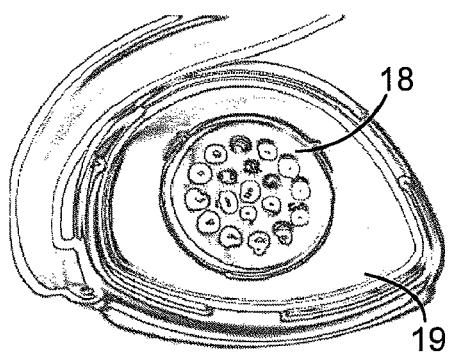

FIG. 2a shows a headset with a left unit and a right unit, where a head band 9 connects the left and right units. Similar to FIG. 1, the left unit comprises a speaker 11a with a housing, and an acoustic sensor 10a being disposed with the housing of the speaker 11a; the right unit comprises a speaker 11b with a housing, and an acoustic sensor 10b being disposed with the housing of the speaker 11b. FIG. 2b shows the inner structure of a speaker housing. The speaker housing comprises an outer shell 12, and a flat surface panel 15 that holds the speaker 14, where the acoustic sensor 13 is fitted on the outer shell. FIG. 2c shows the outer view of the outer shell 16, where the acoustic sensor 13 can also be seen from the small opening 17. FIG. 2d shows the plan view of the flat surface panel 19, where the speaker 18 can be seen.

Figure 3:
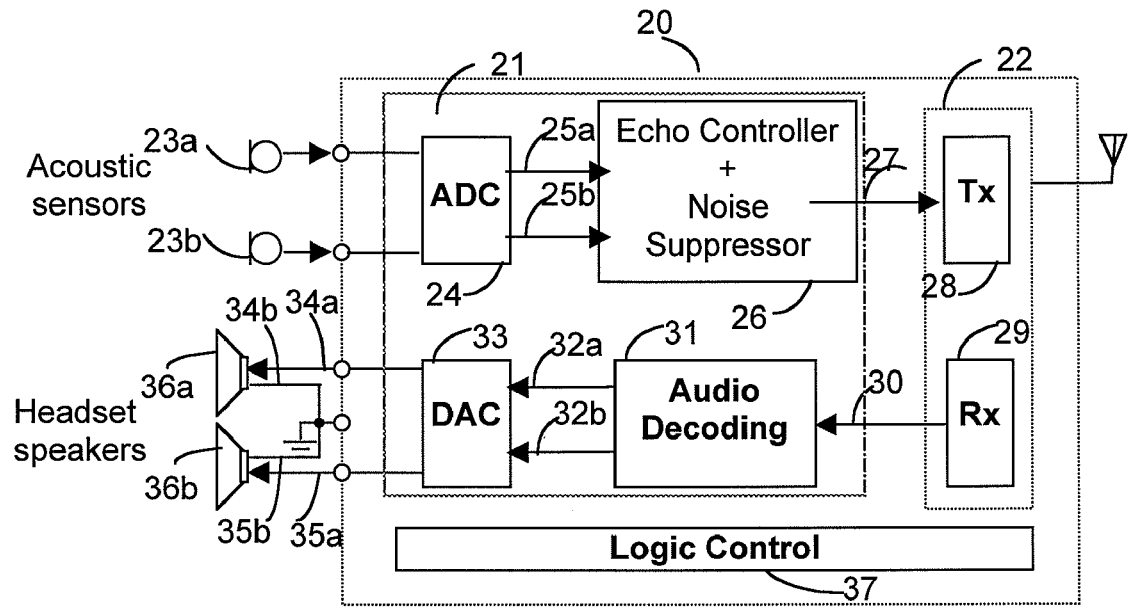
FIG. 3 shows one exemplary block diagram of the electronic circuitry of the headset in accordance with one embodiment of the present invention.

Now referring to FIG. 3, there is provided one exemplary block diagram of the electronic circuitry of the headset in accordance with one embodiment of the present invention. The electrical circuitry 20 comprises three functional blocks: an audio signal processing unit 21, a radio frequency unit 22, and a logic control unit 37. The audio signal processing unit 21 is responsible for the input/output audio signal processing. The radio frequency unit 22 (e.g., Bluetooth) provides the wireless capability for data exchange with a base station. The logic control unit 37 manages the flow control and interaction between different functional units.

Still referring to FIG. 3, the audio signal processing unit 21 is electronically connected with the acoustic sensors 23a, 23b, and the speakers 36a, 36b. For audio input, signals from acoustic sensors 23a, 23b are converted to digital form through Analog to Digital Converter (ADC) 24. Then, the digital signals from the ADC 24 are routed to the Echo Controller & Noise Suppressor module 26 for signal processing, such as to remove echo, noise and to enhance speech signal. The output is then passed to the transmitting module (Tx) 28 of the radio frequency unit 22 which in turn transmits the final processed signal to the base station.

When an audio signal is received by the receiving module (Rx) 29 of the radio frequency unit 22 from a base station, the audio signal is then passed to the audio signal processing unit 21, where the Audio Decoding module 31 decodes the received audio signal and outputs the decoded audio signals via two separate channels 32a, 32b to the Digital to Analog Converter (DAC) 33 by which the audio signals are converted into analog signals. Then, the analog signals are outputted to the speakers 36a, 36b in certain ways as discussed below in detail. It is to be noted that the received audio signals from the Rx 29 may have been pre-processed in certain format, such as compressed or encrypted. If this is the case, the data is then passed to the Audio Decoding module 31 to perform the inverse function of the pre-processing.

As discussed above, close proximity of acoustic sensors and speakers results in acoustic coupling. Still referring to FIG. 3, when the acoustic sensors 23a, 23b are placed in close proximity with the speakers 36a, 36b, the acoustic sensors 23a, 23b may pick up signals from the speakers 36a, 36b. The "picked up" signals appear as echoes to a remote user in communication or as interference signals to a receiver in voice command control applications.

In one embodiment of present invention, a pair of micropones are mounted on the left/right headset to form a 2-mic array processing. A digital beamformer can be applied to cancel out interference signal and to enhance speech signal within the sweet zone based on spatial information. If the left/right speakers 36a, 36b are made to produce sound wave in opposite phase, the signals induced to the acoustic sensors 23a, 23b will be out of phase. This method generates artificial information to the beamformer that the sound source is not from within the sweet zone, thus it can be separated out and suppressed easily. For example, as shown in FIG. 3, the electrical connections 34a, 34b, 35a, 35b enable the generation of sound wave in opposite phase on the left/right speakers 36a, 36b (the electrical connection of 35a, 35b is in reverse direction of 34a, 34b), thus the signals induced to the acoustic sensors 23a, 23b are 180° out of phase. In another instance, the electrical connections from the output of DAC 33 to the left/right speakers 36a, 36b are defined to follow certain guidelines and they are in phase. In this case, phase inversion can be achieved through software adjustment. For example, the signal at input 32b of DAC can be multiplied by −1 in digital form, producing analog signal 180° out of phase. The phase inversion method of the present invention is based on the fact that human ears are not sensitive to sound wave in opposite phase, however the echo picked up by the acoustic sensors will be in opposite phase which can be suppressed easily through beamforming discussed in detail hereinafter.

An effective way to ensure that the speakers 36a, 36b are able to produce sound wave in opposite phase is by verifying the signal received from the left/right acoustic sensor 23a, 23b using mono signal. Whether or not the electrical connection to the left/right speakers should be reversed, this method guarantees that a right setup can be enforced.

Figure 6:
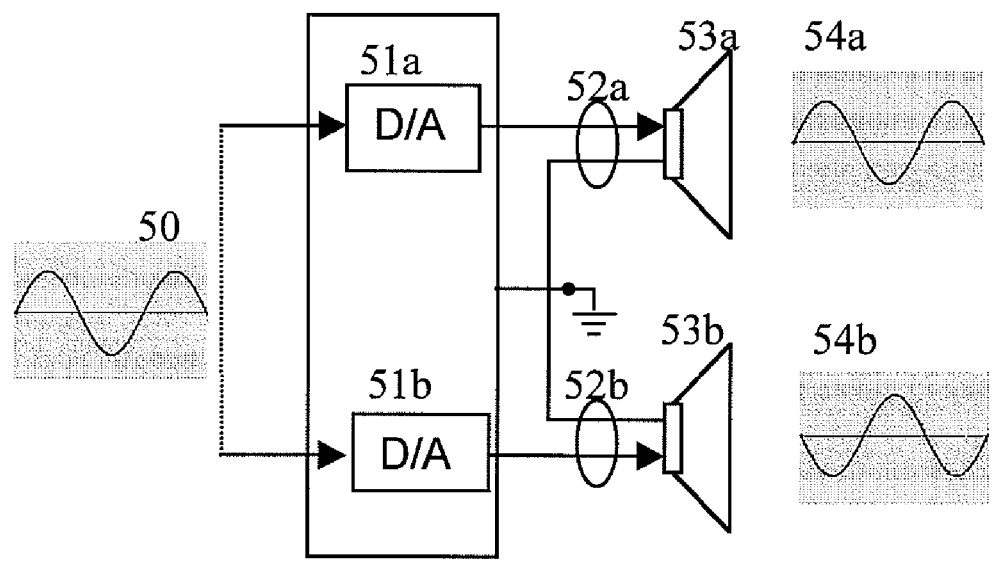
FIG. 6 is a functional block diagram of generating sound wave of opposite phase in accordance with one embodiment of the present invention.

Referring to FIG. 6, there is provided a functional block diagram of generating sound wave of opposite phase in accordance with one embodiment of the present invention. As shown in FIG. 6, speakers 53a, 53b are of same type but the wiring orientation, sequence to the D/A output are reversed in one of the speaker as shown by 52a, 52b. In this manner, the speakers produce sound waves 54a, 54b in opposite phase when a mono signal is playback.

Figure 7:
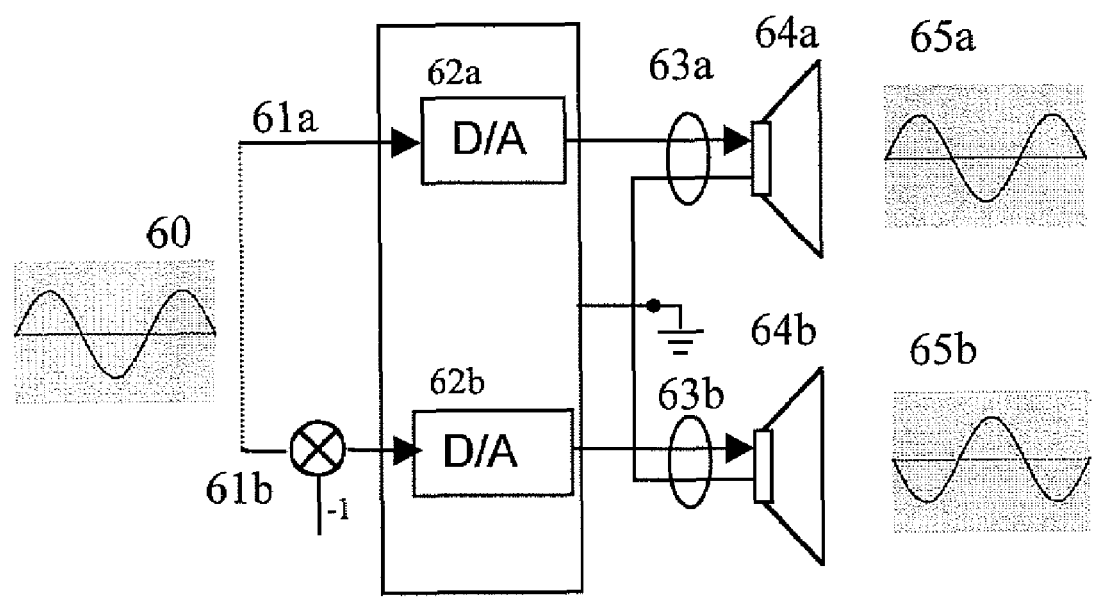
FIG. 7 is another functional block diagram of generating sound wave of opposite phase in accordance with one embodiment of the present invention.

Referring to FIG. 7, there is provided another functional block diagram of generating sound wave of opposite phase in accordance with one embodiment of the present invention. As shown in FIG. 7, if two speakers 64a, 64b of same type are connected to the D/A output in the same wiring sequence and orientation 63a, 63b, sound wave of opposite phase 65a, 65b can be generated by inverting or shifting one of the data input to the D/A in software. This method is illustrated by a software multiplier 61b that inverts the input data by multiplying it by −1 before it is streamed to D/A 62b.

In another embodiment of the present invention, the echo picked up by the acoustic sensor due to acoustic coupling can be cancelled through direct filtering. This method is possible if both signals picked up from the acoustic sensor and the signal output to the speaker are synchronized.

Now there are more details of beamforming. Prior to discussing of beamforming, a beamformer and concept of sweet zone are briefly introduced.

Figure 4:
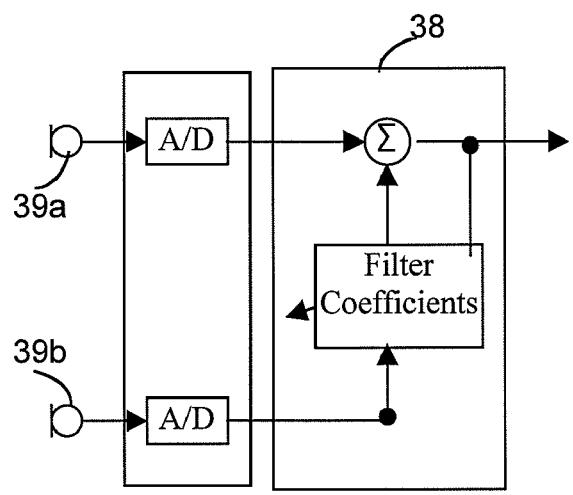
FIG. 4 shows an exemplary electronic circuitry of a digital beamformer/noise suppressor in accordance with one embodiment of the present invention.

FIG. 4 shows an exemplary electronic circuitry of a digital beamformer/noise suppressor 38 in accordance with one embodiment of the present invention. The digital beamformer/noise suppressor 38 comprises a Filter Coefficients module for filtering the noises and an adder for summing the signals from both acoustic sensors before outputting them. A sweet zone can be formed by the beamformer based on the spatial information derived from acoustic sensor 39a and 39b which will be discussed in the next section.

Figure 5:
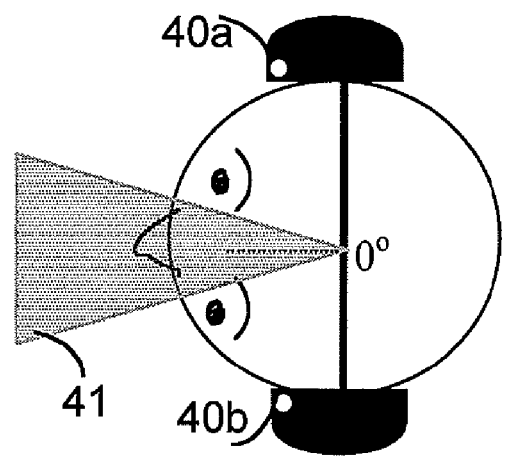
FIG. 5 illustrates a sweet zone that is defined by a beam formed from the center of the acoustic sensor array.

FIG. 5 illustrates a sweet zone defined by the beam 41 that is formed from the center of a 2-acoustic sensor array 40a, 40b that covers the mouth position. The beam width is defined as ± degree from the center of the beam. In this embodiment, ± is set as 7.5 degree. Within the sweet zone, signals from wearer's mouth location will be picked up whereas the interference signal originating outside the beam (wearer's surrounding noise) will be cancelled. In the case whereby signal picked up by acoustic sensor 41a, 40b is induced from the adjacent speaker due to acoustic coupling, the signals (echo) will be in opposite phase (180° out of phase due to the phase inversion method), therefore they can be suppressed easily by the beamformer because they are not from within the sweet-zone. The adaptive noise suppression further enhances the SNR of wearer's speech and produces a crystal clear signal with minimum noise. This output signal is suitable for communication and speech recognition. A narrower beam produces better interference signal suppression. It is to be appreciated that when the acoustic sensors 39*a*, 39*b* are to be placed on the left/right side of a human head, the sweet zone could be about 0 degree from the center of array, resulting in the maximum suppression of signals from ambient environment.

The digital beamformer/noise suppressor 38 operates on the output of an array of acoustic sensors in order to enhance the amplitude of a coherent wavefront relative to background noise and directional interference. The goal of beamforming is to sum multiple elements to achieve a narrower response in a desired direction. This is possible because the two acoustic sensors are placed on the left and right side of a human head, providing sufficient spatial information for the filter to work efficiently.

Due to the unique layout of an array of two acoustic sensors separated at a distance approximately to the width of human head, the audio signals picked up by the acoustic sensors contain useful spatial information. The spatial information can be used to differentiate speech from unwanted signal. A beamformer is suitable to achieve this purpose. For input audio processing, it is preferable to involve at least one beamforming stage that makes use of spatial information from the acoustic sensors so as to enhance speech signal picked up from the wearer's mouth and suppress or separate out interference signal.

Another advantage is that the layout is "locked" to the movement of human head. When the human head moves, the acoustic sensors move in the same orientation with equal magnitude, thus providing a consistent and stable reference with respect to the mouth position. Having a stable reference to the mouth position is an important criterion for the functional behavior of beamformer. In addition, the layout ensures that the mouth position appears from the center of the array formed by acoustic sensors. This translates to about 0 degree using a beamformer. Thus it is possible to form a sweet zone centered around 0 degree using a beamformer that covers the mouth position without having to know the exact dimension of the array. Therefore, this layout is very practical for use in most cases because it is not sensitive to variation of human head width and yet able to provide consistence reference with respect to the mouth position.

The present invention can be used for the following applications:

Entertainment: A user will be able to listen to high quality music wirelessly. The source of music can be from a mobile phone, MP3 player or a computer.

Communication: A user is able to communicate to the mobile phone in hands free mode. The user is also able to pick-up incoming phone calls while listening to music. Intercommunication among headset also enable the communication between users having the headsets.

Voice command control: While listening to music, a user can also give voice command to activate various tasks of the base unit, provided the base unit is speech-enabled.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A method for echo control of a wireless headset wherein the wireless headset comprises closely disposed speakers and audio microphones, said method comprising:
    inverting the phases of the output audio signals from the speakers; thereby when two speakers are employed, the phases of the output audio signals from one speaker are inverse to that from the other speaker; and
    suppressing the signals from the speakers that are picked up by the audio microphones due to the inverse phases of the output audio signals from the speakers, resulting in echo control.

2. The method of claim 1, wherein the step of inverting the phases comprises employing an electronic circuitry so that the sound waves produced by the two speakers are inverse in terms of phases.

3. The method of claim 1, wherein the step of inverting the phases comprises employing a software that can inverse the phases of audio signals.

4. The method of claim 1 wherein the suppressing step employs a digital beamformer, wherein the digital beamformer comprises a filter coefficients module for filtering noises and an adder for summing the signals from the audio microphonese before outputting the added signals.

* * * * *